Oct. 1, 1929.    W. A. CHRYST    1,729,761
IGNITION STARTING APPARATUS
Original Filed April 18, 1925    2 Sheets-Sheet 1

Inventor
William A. Chryst
By Spencer Hardman & Fehr
His Attorneys

Oct. 1, 1929.  W. A. CHRYST  1,729,761
IGNITION STARTING APPARATUS
Original Filed April 18, 1925  2 Sheets-Sheet 2

Inventor
William A. Chryst
By Spencer Hardman & Fehr
His Attorneys

Patented Oct. 1, 1929

1,729,761

UNITED STATES PATENT OFFICE

WILLIAM A. CHRYST, OF DAYTON, OHIO, ASSIGNOR TO DELCO-REMY CORPORATION, OF DAYTON, OHIO, A CORPORATION OF DELAWARE

IGNITION-STARTING APPARATUS

Original application filed April 18, 1925, Serial No. 24,065. Divided and this application filed March 21, 1927. Serial No. 177,184.

This invention relates to apparatus for starting internal-combustion engines, and particularly to the type of apparatus which includes an electric motor normally disconnected from the engine, and a gear operated by the motor and movable into mesh with a gear connected with the engine to be started.

This application is a division of Patent No. 1,640,753, issued August 30, 1927.

One object of the present invention is to provide a novel one-way-operating clutch through which power is transmitted from the electric motor to the motor gear when cranking the engine, the clutch permitting the motor gear to run free of the electric motor when the engine becomes self operative.

Further objects and advantages of the present invention will be apparent from the following description, reference being had to the accompanying drawings, wherein a preferred form of embodiment of the present invention is clearly shown.

Figure 1:
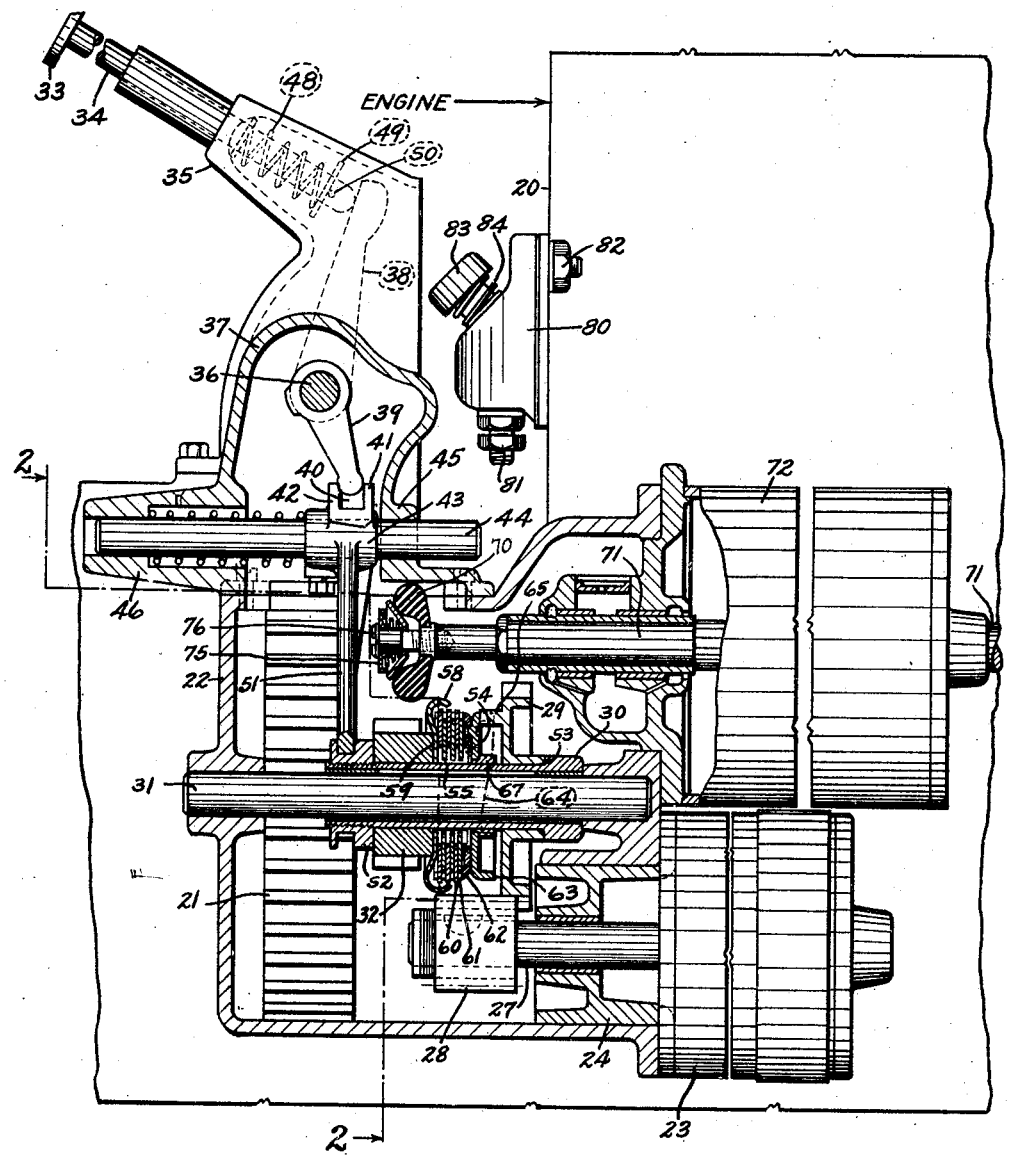
Fig. 1 is a fragmentary side elevation partly in longitudinal section of starting apparatus embodying the present invention.
Figure 2:
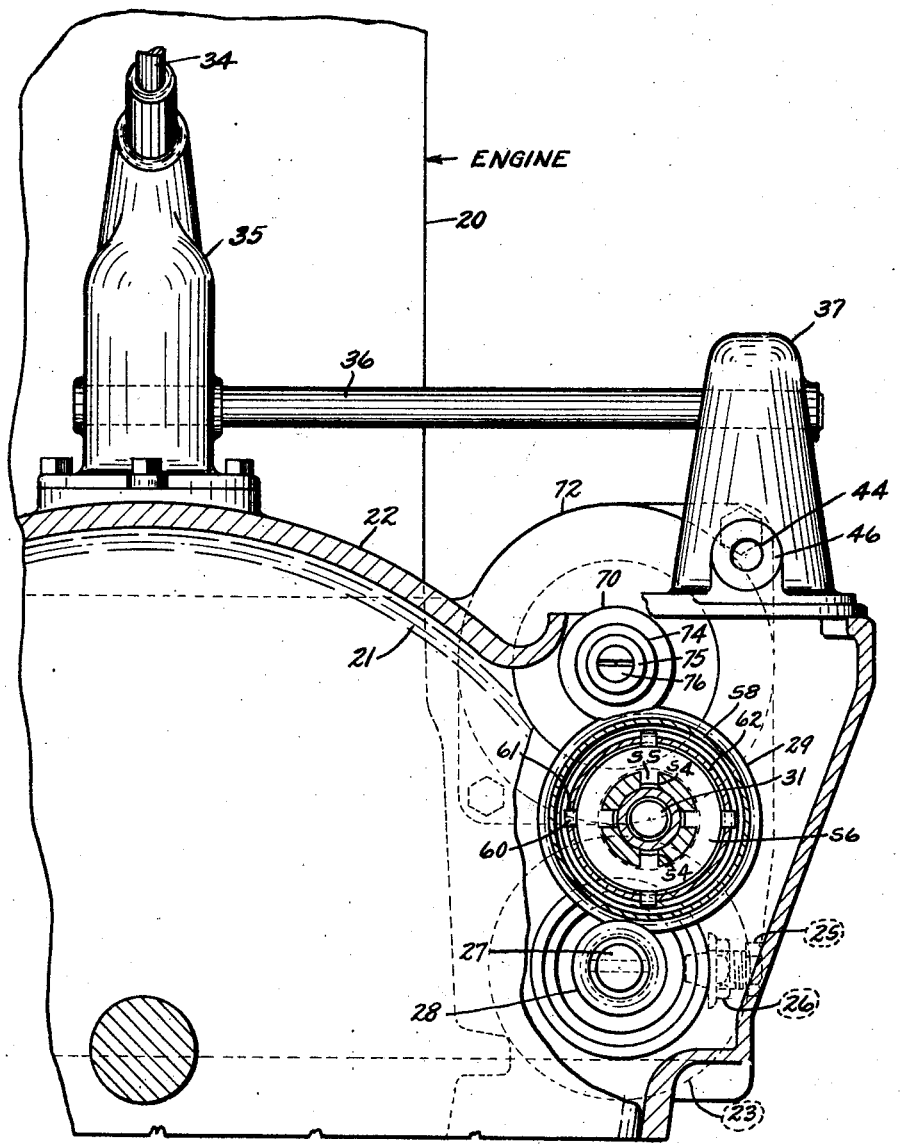
Fig. 2 is a sectional view on the line 2—2 of Fig. 1.

Referring to the drawings, 20 designates an internal-combustion engine including a flywheel gear 21 inclosed by a flywheel housing 22. The housing 22 supports a starting motor 23, the frame of which includes a tubular extension 24 received by a cylindrical recess provided by the housing 22. The extension 24 is held in place by a set screw 25 and lock nut 26. The motor 23 includes a shaft 27 which drives a gear 28 meshing continually with a gear 29 which is loosely journaled upon a sleeve 30 slidable upon a rod 31 which is supported by the housing 22. A gear 32 is also loosely journaled on the sleeve 30 and is adapted to mesh with and drive the engine gear 21. The sleeve 30 is shifted endwise by a manually-controlled mechanism including a pedal 33 attached to a rod 34 which is slidably supported by a bracket 35 mounted upon the housing 22. Bracket 35 supports a shaft 36 which is supported also by a hollow bracket 37. A lever arm 38 is attached to the rod 36 and is located within the bracket 35, so as to be engaged by the rod 34. A lever arm 39 is attached to the rod 36 and is located within the hollow bracket 37 and is received by a notch 40 included between lugs 41 and 42 which extend upwardly from a sleeve 43. Sleeve 43 is attached to a rod 44 which is slidable in bearings 45 and 46 provided by the bracket 37. A spring 48 interposed between the bracket 35 and a washer 49 retained by a pin 50 on the rod 34, tends to maintain the rod 34 in engagement with the lever 38 when the pedal 33 is not pressed by the operator. The spring 48, therefore, tends to prevent a noise due to the rattling of the rod 34 within the bracket 35. The sleeve 43 is provided with a shifting fork 51 for engaging a grooved collar 52 which is threadedly connected with the sleeve 30. The collar 52 and a shoulder 53 provided by the sleeve 30 limit the separation of the gears 32 and 29.

The hub of gear 32 is provided with notches 54 for receiving the tongues or fingers 55 of friction plates 56 and of a pinion driving disc 57 having an annular flange 58 for a purpose to be described. The friction plates 56 and the disc 57 cooperate with friction plates 59 having outwardly projecting tongues 60, which are received by the notches 61 of a cup-shaped member 62, which is attached to a clutch controlling disc 63 having an annular flange provided with a camming edge 64 adapted to cooperate with a companion oblique camming surface provided by the annular flange 65 extending from the gear 29 which provides the driving clutch controlling disc. The camming member 63 is attached to a hub 67 which is slidably mounted on the sleeve 30. It is evident, therefore, that when the gear 29 is the driving member relative to the gear 32, the cam 63 will tend to move away from the cam 65. This action tends to force the gear 29 against the shoulder 53 and the gear 32 against the collar 52 and to increase the friction between the plates 55 and 59 and the disc 56, so that the gear 29 will drive the gear 32 through the friction plate clutch.

In order to impart initial rotation to the motor gear as it is advanced into mesh with the engine gear 21, there is provided a rotatable device which is actuated independently of the motor and of the mechanism for shifting the motor gear 32. This rotatable device includes a friction wheel 70 which is drivingly connected with the shaft 71, which is operated by a power device 72. During movement of the gear 32 toward the left in Fig. 1, the peripheral flange 58 of the disc 57 is engaged by the friction wheel 70, which engages the disc 57 before the gear 32 engages the gear 21, and is not relieved of engagement with the disc 57 until after the pinion 32 is partly in engagement with the gear 21. The wheel 70 is constructed preferably of pliable rubber, and is yieldably maintained in the position shown, by a spring 73 which urges a cup-shaped washer 74 against the wheel 70. Spring 73 is retained by a washer 75 and a screw 76, which passes through the washer 75, spring 73, and disc 74, and which threadedly engages the end of the shaft 71.

The power device 72 is a dynamo, in the disclosed form of the invention, which may operate as a generator when driven by the engine, or may act as an auxiliary motor for turning the wheel 70 at relatively slow speed.

80 designates a switch for controlling the starting motor circuit. The switch 80 includes stationary contacts (not shown) but connected with switch terminals 81 and 82, and a movable contact (not shown) connected with a switch plunger 83 arranged in the path of movement of the free end of lever 38. The switch contacts are normally maintained separated by a spring 84, located between the head of the switch plunger and the casing of the switch.

To start the engine the dynamo 72 is connected with a current source, causing the dynamo to operate slowly as a motor. Then the pedal 33 is pressed to cause the gear 32 to move to the left in Fig. 1, and to cause the periphery 58 of the disc 57 to be engaged by the slowly-rotating wheel 70. By rotating the gear 32 in this manner, it can be readily moved into registration for enmeshment with the gear 21. Continued movement of the pedal 33 downwardly, causes the gear 32 to be meshed completely with the gear 29 and the motor switch 80 to be closed only after substantially complete enmeshment of gears 32 and 21 has been effected. The closing of the switch 80 causes the motor 23 to be connected with the current source. The motor will turn the gear 29 relative to the gear 32 to tighten the disc clutch. Thereafter, the gear 32 is driven by the motor for cranking the engine through the gear 29. When the engine becomes self-operative the gear 32 tends to rotate faster than the gear 29, thereby causing pressure between the clutch plates to be relieved and the gear 32 to be permitted to rotate relative to the gear 29. Hence the speed of the motor shaft 27 will be kept within safe limits after the engine is started and before pedal 33 has been released. Release of pedal 33 permits a spring 95 which encircles the rod 44, to be released in order to move the pinion 32 out of mesh with the gear 21.

During movement of the gear 32 into mesh with the gear 21, slipping may take place between the disc 57 and the wheel 70 in order to allow the pinion 32 to be meshed with the gear 21, while the shaft 71 is still rotating. As the gear 32 is moved out of mesh from the gear 21, the disc 57 will again be applied to the wheel 70 and will tend to rotate the wheel 70 faster than normal. Due to the greater inertia of the shaft 71 and parts carried thereby, the motion of the pinion 32 will be quickly retarded after it is unmeshed from the flywheel gear 21.

While the form of embodiment of the present invention as herein disclosed, constitutes a preferred form, it is to be understood that other forms might be adapted, all coming within the scope of the claims which follow.

What is claimed is as follows:

1. Engine starting apparatus comprising in combination, a motor; a motor driven gear movable endwise into mesh with the gear of an engine to be started, a friction clutch having axially relatively movable driving and driven members, the driven member being connected with the motor gear; clutch controlling discs providing axially engaging cams having coacting surfaces adapted to produce relative endwise movement of the cams in response to transmission of motion through the cams, the driven cam disc being connected with the clutch driving member; means for connecting the driving clutch control disc with the motor and permitting endwise movement of the driving disc, means for coaxially supporting the motor gear, the clutch members, and the clutch control discs, means for limiting separation of said coaxially supported elements, and means for moving said elements endwise and for causing the motor to operate.

2. Engine starting apparatus comprising, in combination, a motor; an endwise movable shaft having spaced stops; a gear, a friction clutch, and clutch controlling discs, located between said stops and supported by said shaft, said clutch controlling discs providing axially engaging cams having coacting surfaces adapted by the transmission of motion through the cams to cause relative endwise movement between the driven and driving members of the cams; means for connecting the driving clutch control disc with the motor; means for connecting the driven clutch control disc to the driving member of the clutch; means for connecting the driven clutch member with the gear; and means for moving the shaft endwise in order to move said gear into mesh with the gear of an engine to be started, and for causing the motor to operate.

3. Engine starting apparatus comprising, in combination, a motor; an endwise movable shaft having spaced stops; a gear, a friction clutch, and clutch controlling cams, located between said stops and supported by said shaft, said clutch cams having coacting surfaces adapted by the transmission of motion through the cams to cause relative endwise movement between the driven and driving members of the cams; means for connecting the driving cam with the motor including a gear on the motor shaft, and meshing therewith, a gear carried by the endwise movable shaft; means for connecting the driven cam to the driving member of the clutch; means for connecting the driven clutch member with the gear; and means for moving the shaft endwise in order to move said first mentioned gear into mesh with the gear of an engine to be started, and for causing the motor to operate.

4. Engine starting apparatus comprising, in combination, a motor; a motor driven gear for engaging the gear of an engine to be started; means for connecting the motor with the motor gear and including a friction clutch and, coaxial therewith, a pair of clutch controlling discs having coacting cams adapted by the transmission of motion through the cams to cause relative endwise movement between the driving and driven members of the cams, means rotatably supporting the clutch and control discs, and means including the clutch for limiting axial separation of the control discs; and means for moving the motor gear into mesh with the engine gear and for causing the motor to operate.

5. Engine starting apparatus comprising, in combination, a motor; a motor driven gear for engaging the gear of an engine to be started; means for connecting the motor with the motor gear and including a friction clutch and, coaxial therewith, a pair of clutch controlling discs having coacting cams adapted by the transmission of motion through the cams to cause relative endwise movement between the driving and driven members of the cams, means for supporting the motor gear, clutch and control discs for rotary and axial movement, and means including the clutch for limiting axial separation of the control discs; and means for moving the motor gear into mesh with the engine gear and for causing the motor to operate.

6. Engine starting apparatus comprising, in combination, a motor; an endwise movable shaft; a motor driven gear, a friction clutch and clutch controlling discs mounted on said shaft in tandem relation; means for limiting axial separation of the members on said shaft; axially engageable cams provided by said discs and adapted by the transmission of motion through the cams to cause relative endwise movement between said cams; means connecting the driven clutch controlling disc with the driving member of the clutch; means for connecting the driven member of the clutch with the pinion; means for connecting the driving clutch controlling disc with the motor; and means for moving the shaft endwise in order to mesh the motor gear with the gear of an engine to be started and for causing the motor to operate.

In testimony whereof I hereto affix my signature.

WILLIAM A. CHRYST.

CERTIFICATE OF CORRECTION.

Patent No. 1,729,761.  Granted October 1, 1929, to

WILLIAM A. CHRYST.

It is hereby certified that error appears in the above numbered patent requiring correction as follows: In the grant and in the head to the printed specification, title of invention, for "Ignition Starting Apparatus" read "Engine-Starting Apparatus"; and that the said Letters Patent should be read with this correction therein that the same may conform to the record of the case in the Patent Office.

Signed and sealed this 5th day of November, A. D. 1929.

(Seal)

M. J. Moore,
Acting Commissioner of Patents.